Oct. 19, 1948.   G. E. UNDY   2,451,997
ELECTRONIC TIMING CONTROL SYSTEM
Filed June 2, 1944   2 Sheets-Sheet 1
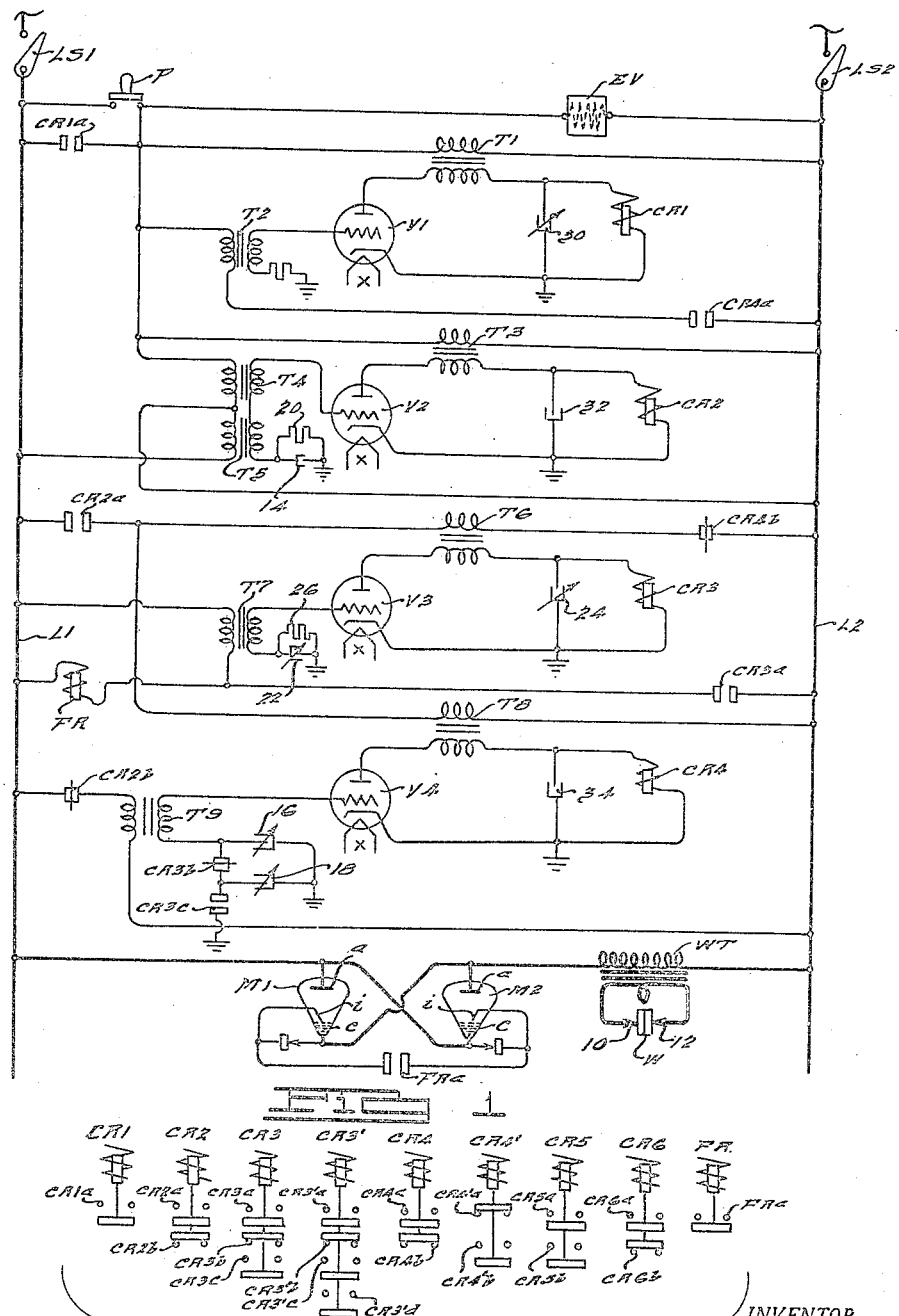
INVENTOR.
Gustav E. Undy.
BY
Harness, Dickey & Pierce
ATTORNEYS.

Patented Oct. 19, 1948

2,451,997

UNITED STATES PATENT OFFICE 2,451,997

ELECTRONIC TIMING CONTROL SYSTEM

Gustav E. Undy, Detroit, Mich., assignor, by mesne assignments, to Weltronic Company, Oakland County, Mich., a corporation of Michigan Application June 2, 1944, Serial No. 538,407

11 Claims. (Cl. 250—27)

The present invention relates to timing control systems, and, in its disclosed embodiments, provides improved and simplified control systems for resistance welding systems of the pulsation type.

The principal objects of the present invention are to provide improved systems of the above, generally indicated type, which are simple in construction, economical of manufacture, and efficient and reliable in operation; to provide such systems which may be characterized as providing for the delivery of current, from an associated source, to a work circuit, during each of a predetermined number of periods, and as further embodying means for adjustably determining the number of such periods; to provide such an arrangement wherein the number of such periods is determined in accordance with the relative capacities of two or more energy storage devices, preferably condensers; to provide such systems wherein for each such period, a part of the energy is withdrawn from one storage device, the succession being terminated when the summation of such parts reaches a predetermined proportion of the total energy originally stored in the device; to provide such arrangements wherein the part of such energy which is withdrawn for each such period is the amount of energy required to charge a companion energy storage device to a predetermined potential; and to provide such arrangements wherein the storage devices from which the energy is withdrawn, as aforesaid, is coupled to an electric valve in such relation as to control the conductivity thereof.

With the above as well as other objects in view, which appear in the following description and in the appended claims, preferred, illustrative embodiments of the invention are shown in the accompanying drawings, throughout the several views of which corresponding reference characters are used to designate corresponding parts; and in which:

Fig. 1 is a diagrammatic view of control circuits embodying the invention;

Fig. 2 is a diagrammatic representation of certain of the electromagnetic relays utilized in the systems of Figs. 1 and 3, and showing the mechanical relationship between the coils and contacts, which are shown separated from each other in Figs. 1 and 3.

Figure 3:
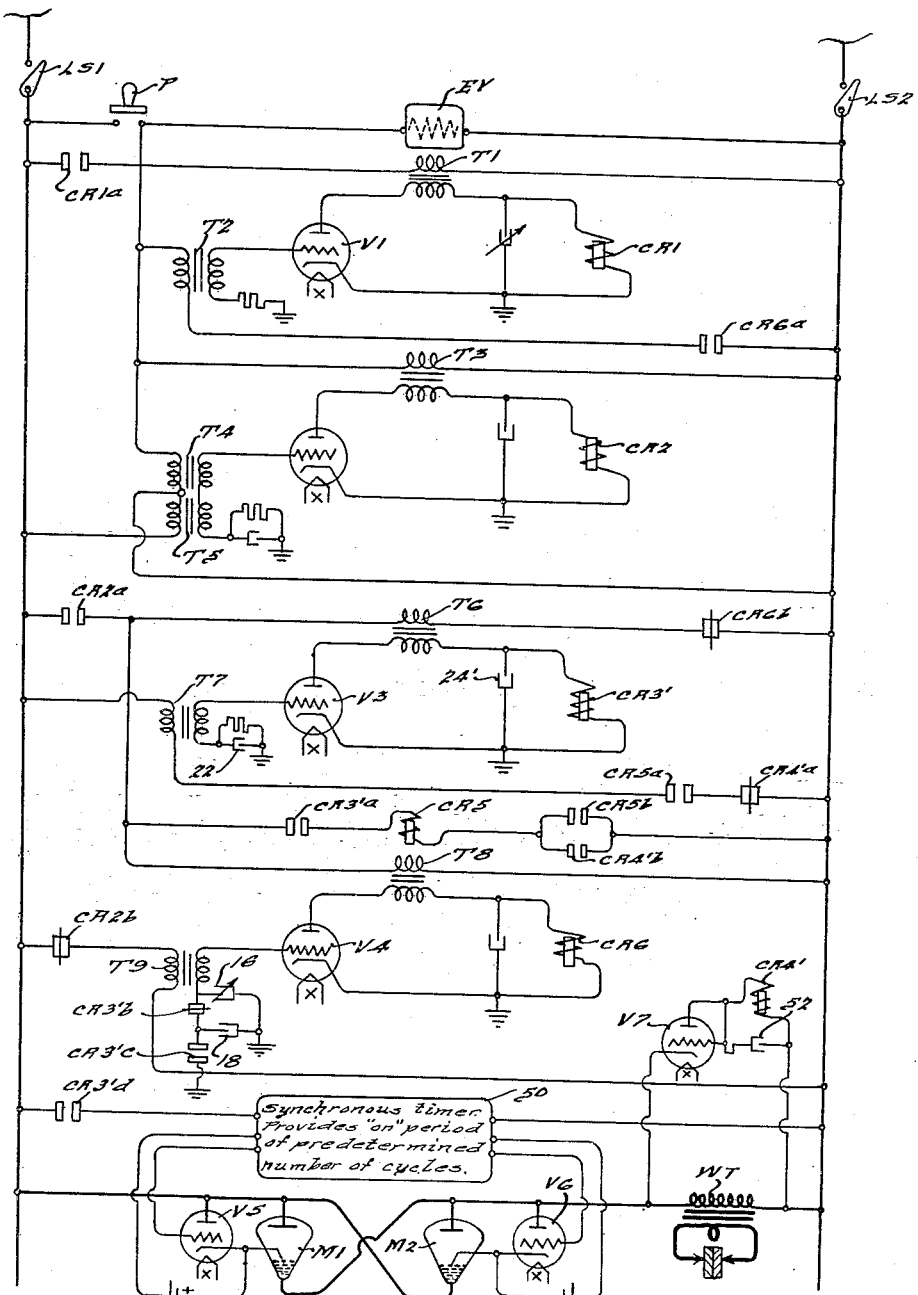
Fig. 3 is a diagrammatic illustration of the control circuits forming a modification of the invention.

It will be appreciated from a complete understanding of the present invention that, in a generic sense, improvements thereof may be used in electrical control systems adapted for widely differing purposes and employing widely differing circuit relationships. The present systems represent preferred embodiments adapted for use in resistance welding control systems of the pulsation type, and are disclosed herein in an illustrative but not in a limiting sense.

In certain of its aspects the improvements of the present invention have to do primarily with the provision of counting or integrating circuits which serve to control or determine the number of successive control operations which result from an actuation of an initiating control member. In the system of Fig. 1 this apparatus is embodied in a so-called non-synchronous, pulsation control system. In Fig. 3, the system is embodied in a pulsation control system which incorporates a synchronous timing feature. In each instance, current is delivered from an associated source to a work circuit, illustrated as a welding circuit, in a succession of "on" periods, and successive "on" periods being spaced apart by an "off" period, each "on" period and each "off" period comprising either an approximately or a precisely determined number of half cycles of the associated source. The counting, or integrating, apparatus serves to determine the number of periods in each such succession.

Referring to Fig. 1, the primary winding of the welding transformer WT is arranged for connection across the line conductors L1 and L2, in series with a pair of conventionally and reversely connected electric valves M1 and M2. The secondary winding of the welding transformer WT is directly connected in the work circuit, illustrated as a resistance welding circuit, employing usual electrodes 10 and 12. Electric valves M1 and M2 may be of any suitable, controlled type, such, for example, as the gas filled mercury pool discontinuous control rectifiers sold commercially under the trade name "Ignitron." As will be understood, these valves are normally non-conductive, but may be rendered conductive during half cycles, during which the anodes $a$ thereof are positive with respect to their cathodes $c$, by applying an igniting potential between the igniters $i$ thereof and such cathodes $c$. When so rendered conductive, the valves remain conductive for the balance of the half cycle of current flow then in progress. The valves M1 and M2 are rendered conductive during each half cycle of each "on" period and are maintained non-conductive during the intervening "off" periods.

The control apparatus for controlling the conductivity at main valves M1 and M2 comprises a series of electric valves V1, V2, V3 and V4 and associated electromagnetic control relays CR1, CR2, CR3, CR4 and FR. The mechanical relation between the contacts of the just-mentioned relays is shown in Fig. 2, it being understood that the contacts of these relays occupy the positions shown in Fig. 1 when the coils thereof are deenergized and move to and remain in, an opposite position when, and so long as, such coils are energized. Valves V1 through V4 may be of any usual type but are preferably usual three-element evacuated valves of the continuous control type. As will be understood, these valves are conductive during half cycles, in which the anodes thereof are positive with respect to their cathodes, and in which the grids thereof are neutral or positive with respect to such cathodes. To simplify the drawings, the circuits, through which heating current is applied to the heating elements of valves V1 through V4, have been omitted, such circuits being represented by the reference characters $x$.

The initiation of a welding cycle is illustrated as being under the control of a pilot switch P, which, will be understood, may be either manually or automatically controlled.

It is believed that the remaining details of the system may best be understood from a description of the operation thereof. Assuming that it is desired to condition the system to make a weld, the illustrative disconnect switches LS1 and LS2 may be closed, which action connects line conductors L1 and L2 to the source of power, which may be an alternating current source of commercial frequency. The energization of line conductors L1 and L2 completes obvious energizing circuits for the primary windings of control transformers T5 and T9, associated with the grids of valves V2 and V4. In response to this action, transformer T5 applies a negative bias to the grid of valve V2 rendering the latter nonconductive and also charges up an associated control condenser 14. The energization of transformer T9 applies a negative bias to the grid of valve V4 and also charges up a pair of counting condensers 16 and 18, which cooperate, as described below, to determine the number of periods during which current is supplied to the welding circuit in response to a single actuation of the pilot switch P. It will be noted that condensers 16 and 18 are directly connected in parallel through a normally closed contact CR3b of control relay CR3 and are thus charged to the same potential when the system is in readiness to make a weld.

The energization of line conductors L1—L2 also applies a potential across the primary winding of the welding transformer and across the parallel connected main valves M1 and M2. Such action is without effect, however, since valves M1 and M2 are normally non-conductive, and remain so unless and until the aforementioned igniting impulses are applied thereto.

Assuming it is desired to make a weld, and assuming further that the work W has been properly positioned between the electrodes 10 and 12, the pilot switch P may be closed. Closure of switch P completes obvious energizing circuits, in parallel with each other, for the solenoid operated valve EV and the primary windings of transformers T1, T3 and T4. Valve EV may be of a usual type, which, upon being energized actuates associated conventional apparatus (not shown) and thereby causes a relative movement between the electrodes 10 and 12 so as to clamp the work W therebetween.

Upon being energized, transformer T1 applies a potential across valve V1 and control relay CR1. Under the conditions stated, the grid of valve V1 is neutral with respect to its cathode and this valve is consequently, in a conductive condition. Thus, transformer T1 is able to pass current through valve V1 and energize control relay CR1.

Upon being energized, control relay CR1 closes its contact CR1a, which action serves only to provide a holding circuit in parallel with the pilot switch P, which may, consequently, be returned to the open position without effect upon the welding operation now in progress.

Upon being energized, transformer T4 opposes and overcomes the biasing potential of the originally energized transformer T5, enabling the energy stored in the condenser 14 to start discharging through the local circuit, including resistor 20. At the expiration of a discharge period, proportioned to allow time for the above-mentioned clamping movements of the electrodes 10 and 12, the grid of valve V2 attains a potential relative to the cathode of this valve at which this valve is conductive. At this time, the now energized transformer T3 is enabled to pass current to and through control relay CR2 and energize the latter, thereby initiating the flow of welding current.

More particularly, upon being energized, relay CR2 closes its contact CR2a and opens its contact CR2b. The opening of contact CR2b interrupts the originally complete energizing circuit for transformer T9, which action is without immediate effect, except that it interrupts the source of charging current for the counting condensers 16 and 18. These condensers remain effective, however, to maintain a negative bias on the grid of valve V4, thereby maintaining the latter in a non-conductive condition.

Closure of contact CR2a completes obvious energizing circuits in parallel for the primary windings of transformers T6 and T8, the circuit for transformer T6 being subject to the now closed contact CR4b of control relay CR4.

Upon being energized, transformer T6 is enabled to pass current through the normally conductive valve V3 and energize control relay CR3. Upon being energized, control relay CR3 closes its contact CR3a, opens its contact CR3b and closes its contact CR3c, the opening of contact CR3b being preferably timed to take place slightly ahead of the closure of contact CR3c.

Closure of contact CR3a completes obvious energizing circuits in parallel for the coil of the firing relay FR and for the primary winding of control transformer T7. The energization of firing relay FR causes closure of its contact FRa. Contact FRa is connected between the igniters of main valves M1 and M2 in the manner described in the Slepian et al. Patent No. 2,165,911, and, in accordance with the description in this patent, such closure results in applying an igniting impulse to that one of the main valves M1 and M2 whose anode is positive during the half cycle in question. So long as contact FRa remains closed also, the igniting impulses are applied to the respective valves M1 and M2, during successive half cycles. Closure of contact FRa thus initiates the flow of welding current to the welding transformer WT and to the associated welding circuit.

Upon being energized, transformer T7 applies a negative bias to the grid of valve V3, which action renders this valve non-conductive and also charges up an associated timing condenser 22. The blocking of valve V3 interrupts the flow of energizing current to the coil of control relay CR3, enabling the energy stored in the associated timing condenser 24 to discharge therethrough and maintain relay CR3 energized during the first "on" period, the length whereof is thus determined by the relative characteristics of relay CR1 and condenser 24. At the expiration of a timing period determined by the adjustment of condenser 24, control relay CR3 resumes the de-energized position.

More particularly, when control relay CR3 resumes the de-energized position, it opens its contact CR3a and restores contacts CR3b and CR3c to the illustrated positions, the opening of contact CR3c being preferably timed to slightly lead the closure of contact CR3b. The opening of CR3a de-energizes the firing relay FR and also de-energizes the transformer T7.

The de-energization of firing relay FR causes its contact FRa to open. This action is without effect on the conductivity of the main valve then passing current, but prevents the ignition of the other main valve at the beginning of the next succeeding half cycle. The opening of contact FRA is thus effective at the expiration of the half cycle then in progress to interrupt the flow of welding current to the welding circuit.

The de-energization of transformer T7 enables the energy stored in condenser 22 to start discharging through the local circuit, including resistor 26, and at the expiration of an adjustable period, brings the grid of valve V3 to a potential at which valve V3 is conductive. The timing period afforded by condenser 22 determines length of the "off" periods which intervene between the "on" periods.

More particularly, when valve V3 is again rendered conductive by the timing out of condenser 22, transformer T6 is effective to again energize control relay CR3 in the previously described manner. When energized, control relay CR3 functions as before to energize the firing relay FR (thereby initiating another flow of welding current to the weld circuit) and also re-energizing transformer T7. The latter action again blocks valve V3 and enables condenser 24 to determine the length of the period of welding current flow. So long as transformer T6 is energized accordingly, control relay CR3 pulsates between an energized condition and a de-energized condition. So long as control relay CR3 is energized, current flows to the welding circuit, and so long as it is de-energized, current flow to the welding circuit is prevented. As will be understood, the settings for condensers 22 and 24 may be adjusted to provide a widely variable number of half cycles in each such "on" period and in each such "off" period.

Considering now the action of contacts CR3b and CR3c, it will be understood that at the beginning of and during each "on" period, contact CR3b is open and contact CR3c is closed. The opening of contact CR3b temporarily isolates condenser 18 from condenser 16, and the closure of contact CR3c completes a low resistance discharge path for condenser 18. Upon completion of this discharge circuit, the energy in condenser 18 is promptly dissipated.

At the expiration of the first "on" period, contacts CR3b and CR3c resume the illustrated positions. Such action interrupts the just-traced discharge circuit for condenser 18 and completes a circuit through which energy is enabled to discharge from condenser 16 into condenser 18. In the usual case in which it is desired to pass welding current to the load circuit during each of a plurality of periods, condenser 18 is adjusted to have a considerably lower capacity than condenser 16, so that such discharge thereof, sufficient to again bring condensers 16 and 18 to the same charged potential, withdraws from condenser 16 only a portion of the energy stored therein. Such withdrawal lowers the potential of the condenser 16 and correspondingly reduces the negative bias on the grid of valve V4, but, in the usual case, such reduction in the negative bias of the grid of valve V4 is not sufficient to render this valve conductive. At the conclusion of the "off" period in question, control relay CR3 is again energized, as described above, which action, at contacts CR3a, initiates the second period of welding current flow. Such re-energization, at contact CR3b, isolates condenser 18 from condenser 16, and, at contact CR3c again completes the discharge circuit for condenser 18. The portion of the charge of condenser 16 which is transferred to condenser 18 at the end of the first "on" period is, consequently, dissipated to ground at the beginning of the second "on" period.

At the end of the second "on" period, relay CR3 is again de-energized, as described below, and restores contacts CR3b and CR3c to the illustrated positions. These actions interrupt the discharge circuit for condenser 18 and enable a second portion of the charge of condenser 16 to be transferred to condenser 18. Such second transfer again reduces the potential of condenser 16, but assuming that more than two "on" periods are desired, such reduction does not entirely eliminate the negative bias on valve V4.

Similar operations occur at the end of the second and succeeding "off" periods and at the beginning of the third and succeeding "on" periods.

At the expiration of the last "on" period of the series, the transfer of a part of the residual energy in condenser 16 to condenser 18 brings the potential of condenser 16 to such a low value as to eliminate the effective bias on the grid of valve V4. The latter action renders valve V4 conductive at the expiration of such last "on" period.

When valve V4 is rendered conductive, the still energized transformer T3 is enabled to pass current therethrough and energize relay CR4, which thereupon closes its contact CR4a and opens its CR4b. The latter action de-energizes transformer T6 and thereby effectively prevents a re-energization of control relay CR3. The closure of contact CR4a completes an energizing circuit for the primary winding of transformer T2, associated with valve V1. Upon being energized, transformer T2 applies a negative bias to the grid of valve V1, thereby rendering the latter non-conductive.

When valve V1 is rendered non-conductive, control relay CR1 is held energized for a short period by the energy stored in its associated condenser 30. At the expiration of this short period, known conventionally as a "cool" period, control relay CR1 resumes the illustrated position, opening its contact CR1a. The opening of contact CR1a interrupts the initially traced maintaining circuits in parallel with the pilot switch P and interrupts the circuits for the electrode valve EV and for transformers T3 and T4. As will be obvious, the de-energization of the latter two transformers interrupts the supply of the energizing current for control relay CR2 and enables transformer T5 to again apply a blocking bias to the grid of valve V2. Upon being de-energized, control relay CR2a interrupts the initial energizing circuit for transformers T6 and T8, it being noted that under the conditions stated, the circuit for transformer T6 is still interrupted at contact CR4b.

The de-energizing of transformer T8 interrupts the supply of energizing current for the coil of relay CR4, thereby restoring this relay to the de-energized position, opening its contact CR4a and reclosing its contact CR4b. The reclosure of contact CR4 b is without effect, since contact CR2a is now open, but the re-opening of contact CR4a de-energizes transformer T2, thereby again conditioning valve V1 for operation.

The resetting operation described above is completed by the reclosure of contact CR2b, which again energizes transformer T9, thereby re-applying a blocking bias to the current of valve V4 and again recharging condensers 16 and 18 to the full potential.

It will be noted that the coils of relays CR2 and CR4 are provided with filtering condensers 32 and 34, which have sufficient capacity to maintain these relays energized during a half cycle, which immediately follows a half cycle in which the associated valves are conductive.

From the foregoing, it will be appreciated that a new welding cycle, duplicating the described cycle, may be initiated by a momentary reclosure of the pilot switch P. In such cycle, by way of a summary, control relay CR3 and its associated timing elements, including condensers 24 and 22, determine the lengths of the successive "on" and "off" periods; during each "on" period current is passed to the welding circuit, and during each "off" period such current flow is prevented; and condensers 16 and 18 cooperate to control the conductivity of valve V4 and serve to determine the number of "on" periods in the series. It will be noted that condensers 16 and 18 affect this control in accordance with their relative capacities, and in accordance with the rates at which the energy is dissipated therefrom, and thus provide for a cycle including one or a predetermined plurality of "on" periods.

The system shown in Fig. 3 is generically the same as the system described above, with the exception that in this instance, a synchronous timer 50 is interposed between the impulsing relay CR3' (which corresponds in other respects to the previously described relay CR3) and the firing circuits of the main rectifiers M1 and M2. The synchronous timer 50 may be of any suitable conventional type arranged, when initially energized, to provide an "on" period of a precisely determined number of half cycles. Such a suitable timer is described and claimed in the copending application of the present applicant, Serial No. 450,483, filed July 10, 1942, now United States Patent 2,420,919, issued May 20, 1947. More particularly, the starting switch, designated 26 in the copending application, may correspond to the contact designation CR3'd in Fig. 3 of the present application; and valves M1, M2, V5 and V6 of the present application may correspond to valves R1, R2, V1 and V2 of the copending application.

In Fig. 3, accordingly, the length of each "on" period is determined by the synchronous timer 50. As before, however, the length of each "off" period is again determined by condenser 22, associated with the grid circuit of valve V3. As before, the overall number of periods is determined by the counting condensers 16 and 18 which function to control the conductivity of the valve V4. In this case, the relay which is connected in the anode circuit of valve V4 is designated CR6 instead of CR4.

Considering the operation of Fig. 3 in more detail, the operations which result from the closure of line switches Ls1 and Ls2 duplicate the operations described with reference to Fig. 1. Also, the operations which result from the closure of the pilot switch P duplicate the previously described operations in so far as concerns the electrode valve EV and control relays CR1, CR2 and CR3'.

It will be recalled that the energization of electrode valve EV1 causes the electrodes to move to clamping engagement with the work, and that relay CR2 interposes a delay which permits the completion of such electrode movement before the impulsing relay CR3' is energized. The remaining operations which take place in the system of Fig. 3 are as follows:

Energization of relay CR3' causes closure of its contacts CR3'a, CR3'c and CR3'd, and causes its contact CR3'b to open. The effect of contacts CR3'b and CR3'c is the same as in the case of Fig. 1, and is summarized below.

Closure of contact CR3'a prepares a circuit for an auxiliary control relay CR5, and closure of contact CR3'b energizes the synchronous timer 50 in the manner described, for example, in the aforesaid copending application. Upon being energized, timer 50 serves to apply, at precisely determined points, in a predetermined number of successive half cycles, igniting potentials between the grids and cathodes of the auxiliary firing valves V5 and V6. Valves V5 and V6 may be, and preferably are, conventional gas-filled, discontinuous control-type rectifiers and are conventionally situated between the anodes and the igniters of the respective main rectifiers M1 and M2. As it will be understood, each time valve V5 is supplied with an igniting impulse, which overcomes the bias voltage of its associated battery 50, such valve becomes conductive and applies an igniting potential between the igniter and the cathode of the corresponding main rectifier M1. Similar comments apply to valve V6.

The energization of the synchronous timer 50 thus initiates the delivery of welding current from the source to the welding circuit. In accordance with conventional practices, timer 50 not only determines the proportion of each half cycle throughout which current flows, but also determines the number of half cycles in a particular "on" period. At the expiration of the "on" period in question, timer 50 operates to prevent further delivery of igniting impulses to valves V5 and V6 until such time as the timer 50 is reset by the opening of contact CR3'd and is again actuated by a reclosure of such contact.

At the beginning of the just-mentioned "on" period, the potential impressed across the primary of the welding transformer WT is also applied across a relay CR4', which is connected in the anode circuit of a conventional rectifier V7. A condenser 52 serves to maintain a supply of energizing current to relay CR4' during each half cycle, which follows a half cycle in which valve V7 conducts current. At the beginning of the "on" period in question, accordingly, relay CR4' is energized and remains so until the end of the "on" period.

Energization of relay CR4' causes closure of its contact CR4'b and the opening of its contact CR4'a. Closure of the former contact completes the originally prepared circuit for relay CR5, which thereupon moves to the energized position, closing its contacts CR5a and CR5b. Closure of the latter contact completes a maintaining circuit for relay CR5, which circuit is subject to contact CR3'a. Closure of contact CR5a is without effect, since contact CR4'a is now open.

At the end of the "on" period in question, the interruption of the supply of current to the welding transformer also interrupts the supply of current to relay CR4'a, which thereupon resumes the illustrated position, opening its contact CR4'b and reclosing its contact CR4'a. The reopening of the former contact is without immediate effect, but the reclosure of contact CR4'a completes an energizing circuit for transformer T7, associated with the grid of valve V3. Upon being energized, transformer T7 applies a blocking potential to the grid of valve V3 and renders the latter non-conductive. In this case, condenser 24', connected in parallel with the coil of relay CR3', is proportioned to hold this relay energized for not more than a half cycle. Consequently, the blocking of valve V3 results in the virtually immediate de-energization of relay CR3', which thereupon restores all of its contacts to the illustrated positions.

The re-opening of contact CR3'd effects the previously-mentioned resetting of the synchronous timer 50 and conditions it for the succeeding "on" period. The re-opening of contact CR3'a de-energizes relay CR5, which thereupon resumes the illustrated position, interrupting its own maintaining circuit, and (at contact CR5a), de-energizing transformer T7. The de-energization of transformer T7 enables the energy stored in condenser 22 to start discharging as before and at the expiration of such period, determined by condenser 22, valve V3 again becomes conductive. When valve V3 is rendered conductive, it initiates the succeeding "on" period in the manner described above. So long, therefore, as transformer T6 remains energized, relay CR3' is impulsed between energized and de-energized positions, each energized period being an "on" period (the length whereof is determined by timer 50), and each de-energized period being an "off" period (the length whereof is determined by condenser 22).

As in connection with Fig. 1, the opening of contact CR2b, at the beginning of the first "on" period, isolates the counting condensers 16 and 18 from the source. At the beginning of each "on" period, the opening of contact CR3'b and the closure of contact CR3'c enables a prompt discharge of condenser 18. The retransfer of these contacts at the end of each "on" period enables a portion of the charge of condenser 16 to be transferred to condenser 18. A predetermined number of such transfers lowers the potential of condenser 18 to such a value as to render valve V4 conductive, which action enables transformer T8 to energize relay CR6. Upon being energized, relay CR6 terminates the welding operation and effects a complete resetting of the system, in the manner described in connection with the energization of relay CR4 in Fig. 1.

Although only two specific embodiments of the invention have been disclosed in detail, it is believed to be obvious that further modifications of the invention may be made without departing from the spirit and scope thereof.

What is claimed is:

1. In a timing control system for controlling the delivery of current from a source of current to a work circuit during each of a plurality of spaced periods of time, the combination of means for causing a said delivery of current during each period and to prevent a flow during the intervening spaces of time; translating means actuable for limiting the number of such periods, means including a pair of energy storage devices, means enabling an energy transfer from one said device to the other, and means operable when a predetermined amount of said energy has been transferred for actuating said translating means.

2. Apparatus as set forth in claim 1 wherein a part of the energy of one said device is transferred to the other at the conclusion of each said period.

3. Apparatus as set forth in claim 1 wherein a part of the energy of one said device is transferred to the other at the conclusion of each said period, and wherein the part so transferred is discharged from the other prior to the beginning of the next period.

4. Apparatus as set forth in claim 1 wherein said translating means includes an electric valve having a control grid and wherein said devices are coupled to said grid.

5. Apparatus as set forth in claim 1 wherein a part of the energy of one said device is transferred to the other in response to the operation of said first-mentioned means.

6. In an electrical control system, an electric valve having principal electrodes and a control electrode, and means for controlling the conductivity of said valve including a pair of condensers at least one whereof is adapted to receive charging current from an associated source and is coupled between said control electrode and one of said principal electrodes, and means for incrementally transferring the charge of said one condenser to the other condenser, whereby to control the conductivity of said valve.

7. The system of claim 6 wherein said means includes means for discharging each such increment from said second condenser before a succeeding increment is transferred thereto.

8. In a timing control system for controlling the delivery of current from a source of current to a work circuit during a predetermined interval, means for initiating a said flow of current, timing means for limiting the length of said period, said timing means comprising translating means, means including a pair of energy storage devices, means enabling an energy transfer from one said device to the other, and means operable when a predetermined amount of said energy has been transferred for actuating said translating means.

9. In an electrical control system, a circuit adapted to supply a load the energization whereof is to be controlled in accordance with a predetermined pattern, a first operating means for controlling said circuit, a first regulating means for controlling the time period during which said operating means is permitted to maintain said circuit in a first condition, a second regulating means for controlling the time period during which said operating means is permitted to maintain said circuit in a second condition, circuit means interconnecting said regulating means whereby said regulating means are alternately rendered effective to provide for alternately maintaining said load circuit in said first and second conditions, a network including a pair of condensers of differing charge capacities for determining the time period in which said load circuit is maintained in said conditions, and a second circuit-controlling means actuated by said inter-connecting circuit means for controlling the interchange of energy between said condensers.

10. In an electrical control system, a circuit adapted to supply a load the energization whereof is to be controlled in accordance with a predetermined pattern, a first operating means for controlling said circuit, a first regulating means for controlling the time period during which said operating means is permitted to maintain said circuit in a first condition, a second regulating means for controlling the time period during which said operating means is permitted to maintain said circuit in a second condition, circuit means interconnecting said regulating means whereby said regulating means are alternately rendered effective to provide for alternately maintaining said load circuit in said first and said second conditions, a network including a pair of condensers of differing charge capacities for determining the time period in which said load circuit is maintained in said conditions, a second circuit-controlling means actuated by said interconnecting circuit means for permitting a transfer of energy from one of said pair of condensers to a second of said pair of condensers, and a third circuit means actuated by said interconnecting circuit means for discharging said second condenser during the time interval between the periods in which said second circuit-controlling means permits said one condenser to charge said second condenser.

11. In an electrical control system, a load circuit, operating means for controlling flow of energy through said circuit, a first network including a pair of current-controlling means and a pair of regulating means, one of said pair of regulating means controlling the time interval during which one of said pair of current-controlling means is in one controlling condition, the other of said pair of regulating means controlling the time interval during which the other of said pair of current-controlling means is in one controlling condition, said one current-controlling means acting upon actuation to a second controlling condition to place said other current-controlling means in its said one controlling condition, said other current-controlling means acting upon actuation to its second current-controlling condition to place said one current-controlling means in its said one controlling condition, means actuated by said other current-controlling means to control the actuation of said operating means in accordance with the actuation of said other current-controlling means whereby the flow of energy through said load circuit is controlled, a second network comprising a pair of condensers of differing charge capacities for determining the time period of operation of said first network, means for initially charging one of said condensers, means operable periodically to provide a transfer of charge from said one condenser to the other of said condensers, means to discharge said other condenser during the time interval between said charge transfers, and means responsive to a predetermined minimum charge of said one condenser to render said first network ineffective.

GUSTAV E. UNDY.

REFERENCES CITED

The following references are of record in the file of this patent:

UNITED STATES PATENTS

| Number | Name | Date |
|---|---|---|
| 2,193,850 | Andrieu et al. | Mar. 19, 1940 |
| 2,232,541 | Levoy, Jr. | Feb. 18, 1941 |
| 2,233,810 | Dawson | Mar. 4, 1941 |
| 2,270,799 | Gulliksen | Jan. 20, 1942 |
| 2,303,453 | Gulliksen | Dec. 1, 1942 |
| 2,329,090 | Smith et al. | Sept. 7, 1943 |
| 2,340,077 | Pearson et al. | Jan. 25, 1944 |
| 2,366,038 | Livingston | Dec. 26, 1944 |
| 2,370,178 | Livingston | Feb. 27, 1945 |